United States Patent [19]
Palenchar et al.

[11] 3,866,100
[45] Feb. 11, 1975

[54] UNIVERSAL MOTOR CONTROL

[75] Inventors: Daniel P. Palenchar; Wayne H. Lehker; David P. Lock, all of Marietta, Ohio

[73] Assignee: Sperry Rand Corporation, New York, N.Y.

[22] Filed: May 30, 1973

[21] Appl. No.: 365,241

[52] U.S. Cl. ............................... 318/257, 318/467
[51] Int. Cl. ............................................. G05b 11/14
[58] Field of Search ........................... 318/255–258, 318/261, 265, 467, 486

[56] References Cited
UNITED STATES PATENTS

| | | | |
|---|---|---|---|
| 3,373,624 | 3/1968 | Gutting | 318/486 X |
| 3,614,578 | 10/1971 | Woodward et al. | 318/467 X |
| 3,723,843 | 3/1973 | Pearson | 318/467 X |

*Primary Examiner*—Robert K. Schaefer
*Assistant Examiner*—W. E. Duncanson, Jr.
*Attorney, Agent, or Firm*—Griffin, Branigan and Butler

[57] ABSTRACT

A motor control circuit is provided for controlling the acceleration, speed, deceleration, stopping and direction of rotation of a drive motor which drives a mechanized filing cabinet. The control circuit is packaged so that it may be connected through electrical connectors to the drive motor, safety interlocks, and automatic and manual controls available on existing mechanized filing cabinets. It may be used with existing mechanized filing cabinets having manual, automatic, or both manual and automatic controls for driving the carrier bins in a cabinet in the shortest direction around an orbital path to a position opposite an access door. Under automatic control, the drive motor is accelerated to a fast speed and maintains this speed until the desired carrier bin approaches the access door. The drive motor is then driven at a slower rate as it comes into the desired position. A two-step braking circuit stops the motor in such a manner that the contents of the carrier bins are not thrown about. A feedback signal from the motor is used to regulate the speed of the motor and prevent excessive speed when an unbalanced load is carried in the carrier bins. Circuits are provided for preventing the inadvertent application of a reverse voltage to the motor while it is rotating.

12 Claims, 6 Drawing Figures

PATENTED FEB 11 1975

UNIVERSAL MOTOR CONTROL

BACKGROUND OF THE INVENTION

This invention relates to a universal motor control circuit suitable for use in various mechanized filing cabinets of the type wherein a plurality of carrier bins or trays are driven in an orbital path to a desired position opposite an access door.

U.S. Pats. Nos. 3,640,596, 3,614,578, 3,480,343, 3,235,319, and 3,202,265 all disclose mechanized filing cabinets wherein a drive motor drives a conveyor system, the conveyor system in turn carrying a plurality of bins, trays, or shelves in a closed loop or orbital path. In order to reduce access time, the motor is capable of being driven in either of two directions so that a desired bin may be brought into position opposite an access door by moving it along the shortest orbital path.

Mechanized filing cabinets have been adapted for many uses such as the storage of papers in offices, the storage of drugs in hospitals, and the storage of food, utensils, and table accessories in kitchens. Such diverse uses have resulted in modifications of the basic filing cabinet. For example, for use in an office it may be desirable to provide automatic addressing means in the form of selection switches so that an operator merely operates one of the selection switches in order to cause the desired bin to be moved into position opposite the access opening. On the other hand, when used in a kitchen such a sophisticated system may not be needed so the system is merely provided with two control switches, one for causing the bins to move in one direction and one for causing them to move in the opposite direction.

The speed at which the drive motor is operated is also dependent upon the particular use of the filing cabinet. When used in an application where automatic addressing is employed, it is desirable to move the selected bin into the access position as rapidly as possible. On the other hand, when used as kitchen storage fast access may not be required and the motor may be driven at a slower speed. A slower speed is also desirable in any application where the operator may not know which bin carries the object or file being sought, but wishes to view the bin contents as they are moved past the access opening.

Because of such diverse uses, varying requirements are placed on the motor control system in addition to those mentioned above. Fast but controlled acceleration is desirable so as to provide fast access time without placing a mechanical overload on the conveyor system or upsetting the contents of the bins. Deceleration and stopping must be smooth and gradual for the same reasons. Provisions must be made for braking the system or maintaining the desired speed when an unbalanced load in the bins may tend to move the conveyor system faster than it is driven by the motor. All of these requirements have led to specialized controls for particular applications. The controls have, for the most part, employed relay circuits requiring period maintenance, and have been designed such that fairly frequent adjustments of the field, acceleration, speed control and braking control circuits are required.

SUMMARY OF THE INVENTION

An object of the present invention is to provide a universal motor control circuit suitable for controlling the acceleration, speed, deceleration and stopping of various types of mechanized filing cabinets used in different applications requiring different drive motor speeds, the various types of cabinets including circuits for applying different commands to the motor control circuit.

An object of this invention is to provide a motor control circuit employing solid state elements and requiring no service adjustment once the circuit has been assembled and initially adjusted.

An object of the present invention is to provide a motor control circuit for a mechanized filing cabinet of the type wherein bins are conveyed in an orbital path, the motor control circuit including means responsive to speed and direction commands derived from a logic circuit and a feedback voltage from the motor to control the duration and direction of application of current pulses through the motor armature.

An object of the invention is to provide a control circuit for controlling the speed and direction of rotation of a motor having an armature and a series field winding, the control circuit including a source of full wave rectified AC voltage, means connecting the armature and field winding to the voltage source, the connecting means including a bridge of controlled semiconductor devices for gating current through the armature in a first or a second direction, means generating a reference voltage, means for deriving from the motor a feedback voltage indicative of its speed, comparator means for comparing the reference voltage with the feedback voltage to produce pulses synchronized with respect to the full wave rectified voltage and having a duration determined by the difference in the compared voltages, a logic circuit for producing direction control signals, and means responsive to said logic circuit and said comparator means for controlling said semiconductor devices.

A feature of the invention is the provision of circuit means responsive to commands from a logic circuit for modifying the feedback voltage from the motor before it is applied to the comparator to thereby select a predetermined desired motor speed.

A futher feature of the invention is the provision of means responsive to the logic circuit for stopping the motor by first modifying the reference voltage to terminate the pulses produced by the comparator means, and then shorting the motor armature.

Yet another feature of the invention is the provision in the logic circuit of means for preventing a sudden change in direction control signals that would reverse current flow through the motor armature before the motor is stopped.

The invention also includes energy storage means for providing voltage to the shunt field winding of the motor for a predetermined period after an inadvertent loss of power.

Other objects and novel features of the invention will become apparent upon consideration of the following description and the accompanying drawing.

DESCRIPTION OF PREFERRED EMBODIMENT

Figure 1:
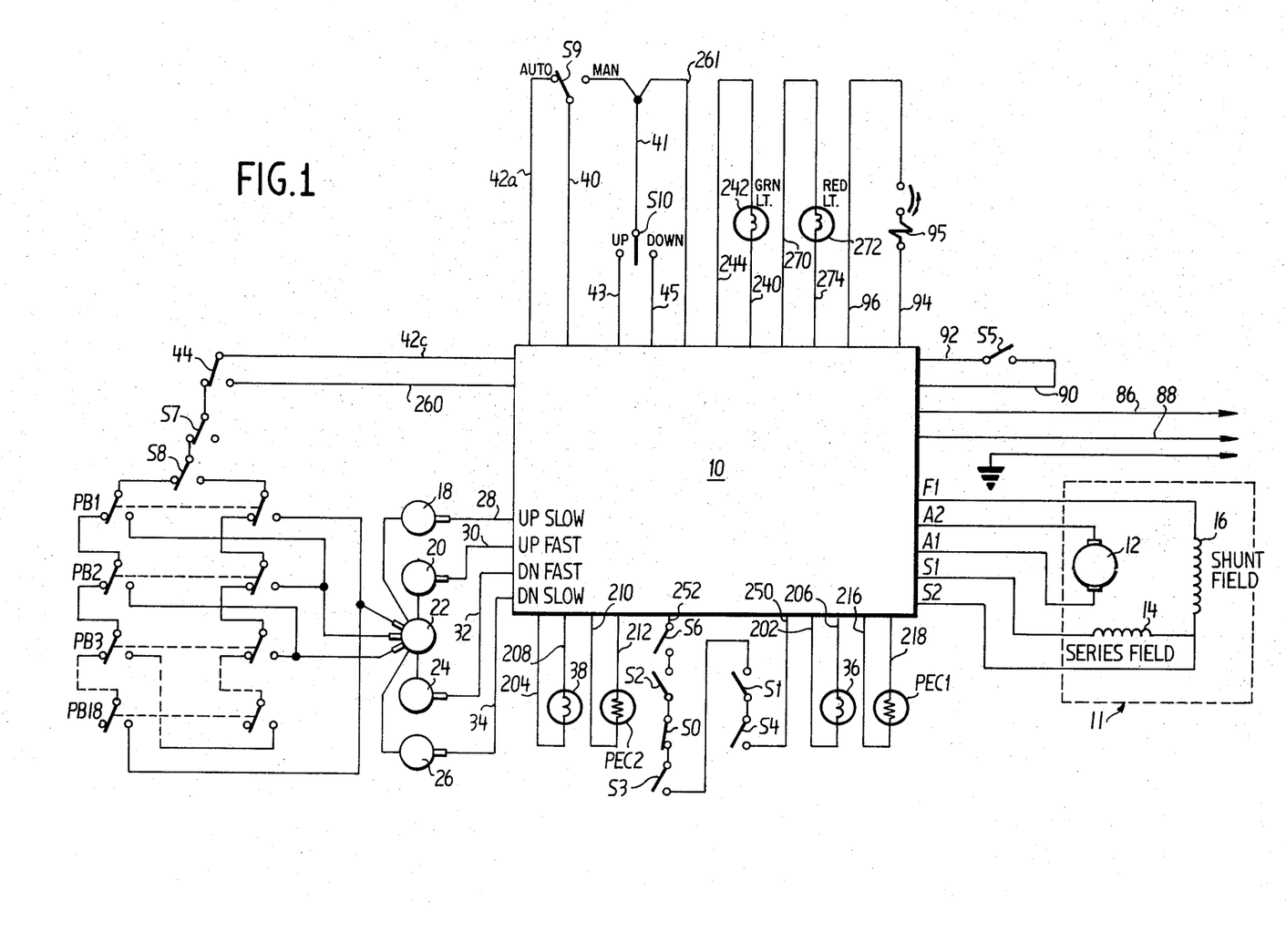
FIG. 1 is a block diagram showing how the present invention may be interconnected with the circuits of one type of mechanized filing cabinet to control its drive motor.

The present invention provides a universal control circuit suitable for use in any one of a variety of different mechanized filing cabinets. FIG. 1 shows how the universal control circuit 10 may be interconnected with the circuits of a mechanized filing cabinet such as that shown in U.S. Pat. No. 3,480,343. As explained in the patent, the filing cabinet includes a plurality of carrier bins that are moved in an orbital path past a posting table. A drive motor 11 having an armature 12, a series field 14, and a shunt field 16, provides the power for driving the carrier bins.

A plurality of push-button switches PB1 through PB18 are provided for selecting which of the carrier bins will be stopped at a position opposite a posting board. There is one push-button switch for each carrier bin and the switches are of the type which remain depressed until the next push-button is depressed. A commutator, including commutator rings 18, 20, 22, 24 and 26, is driven in synchronism with the carrier bins and as the commutator rotates it produces signals on the leads 28, 30, 32 and 34 to control the direction acceleration, deceleration, and stopping of the drive motor. The manner in which the signals are generated is explained in detail in U.S. Pat. No. 3,614,578.

The orbital filing cabinet disclosed in U.S. Pat. No. 3,480,343 is provided with a posting board which may be shifted to either one of two positions. Furthermore, the system is provided with controls such that a preselected carrier bin may be stopped at the posting board regardless of the position of the posting board. A posting board switch S8 has a set of contacts that are normally closed when the posting board is in a lower position. When the posting board is shifted to an upper position the contacts of switch S8 transfer. The switching of S8 has the effect of bringing into the circuit either one or the other of two sets of contacts associated with each of the push-button switches PB1 through PB18. The manner in which the push-button switches are connected to the commutator ring 22, together with the position of the contacts of switch S8, enables the commutator to produce output signals to control drive to the drive motor until such time as the bin corresponding to the depressed push-button is located in a position opposite the posting board. This operation is fully explained in U.S. Pat. No. 3,480,343.

As shown in FIG. 1, the device is provided with a switch S9 for selecting either manual or automatic operation. When automatic operation is selected, depression of one of the push-buttons will cause the motor to be energized and the motor will drive the conveyor system to deliver the selected carrier bin to the position opposite the posting board. The motor may be driven in either direction according to the output signals from the commutator rings so that the bins travel the shortest distance possible around the orbital path in order to deliver the selected carrier bin to the position opposite the posting board.

When the switch S9 is set for manual operation, the push-buttons and the commutator rings are inoperative. A switch S10 is provided and by operating this switch an operator may cause the motor to be driven in one direction or the other. As soon as the switch S10 is released, the motor stops.

The mechanized filing cabinet is provided with a light source 36 which illuminates a first photoelectric cell PEC-1, and a second light source 38 which illuminates a second photoelectric cell PEC-2. As more fully described in U.S. Pat. No. 3,640,596, these lamps and photocells are provided to guard an access opening to the filing cabinet. As more fully explained subsequently, the drive motor of the filing cabinet is stopped if the light beam impinging on either photocell is interrupted. This prevents injury to an operator's arm if the arm should be inserted into the door opening while the carrier bins are in motion, and prevents damage to the filing cabinet if a tray is partially extended from a carrier bin and the carrier bins are driven by the drive motor.

The mechanized filing cabinet is provided with safety interlock switches S0 through S4 and S6 which are connected in series, and a further interlock switch S5. These switches are closed during normal operation and when opened cause the drive motor to stop.

UNIVERSAL CONTROL CIRCUITS

Figure 2A:
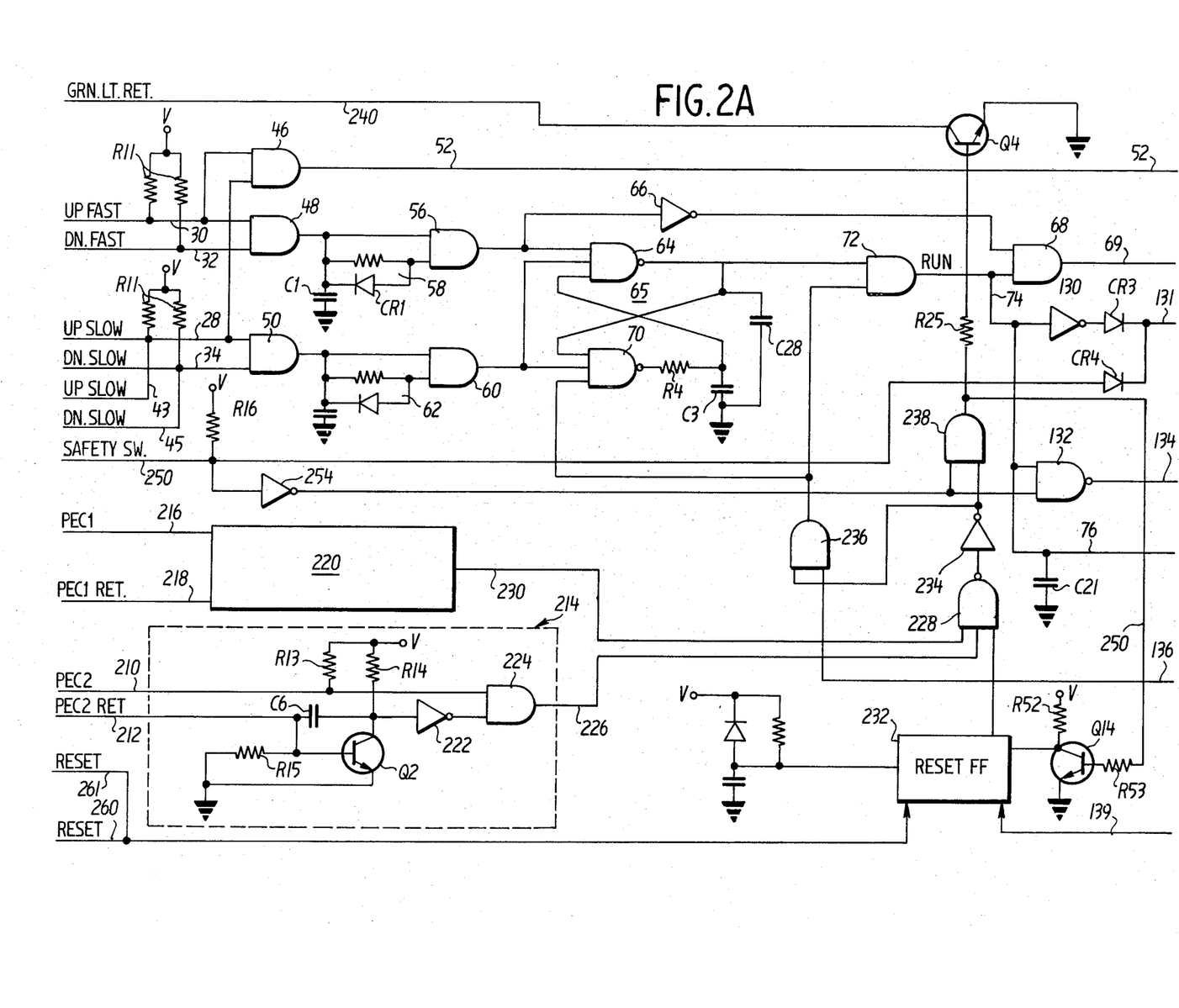
FIGS. 2A-2C, when arranged as shown in FIG. 2D, comprise a schematic wiring diagram of the novel universal motor control circuit; and, FIG. 3 is a block diagram showing how the present invention may be interconnected with the circuits of a second type of mechanized filing cabinet to control its drive motor.
Figure 2B:
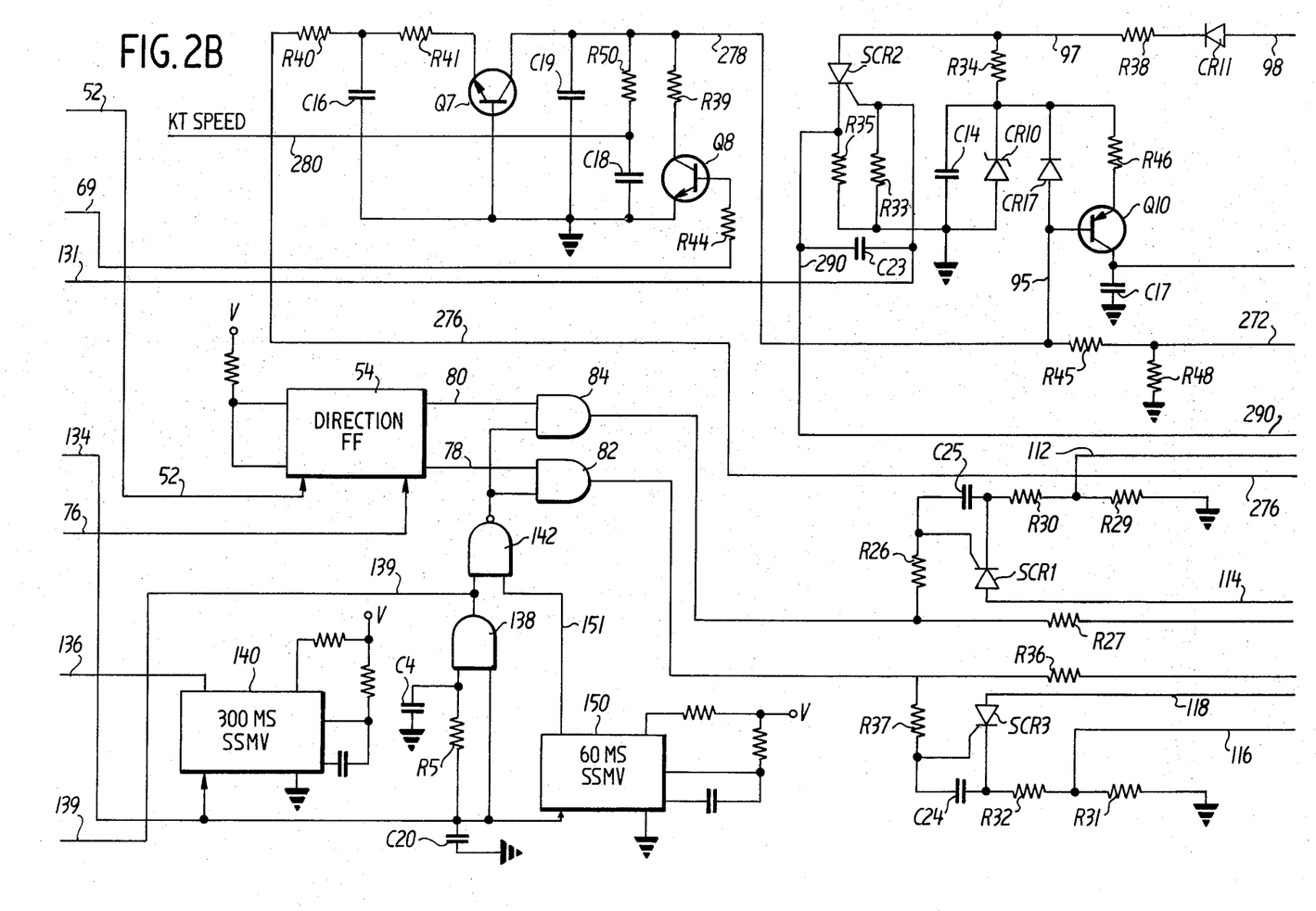
Figure 2C:
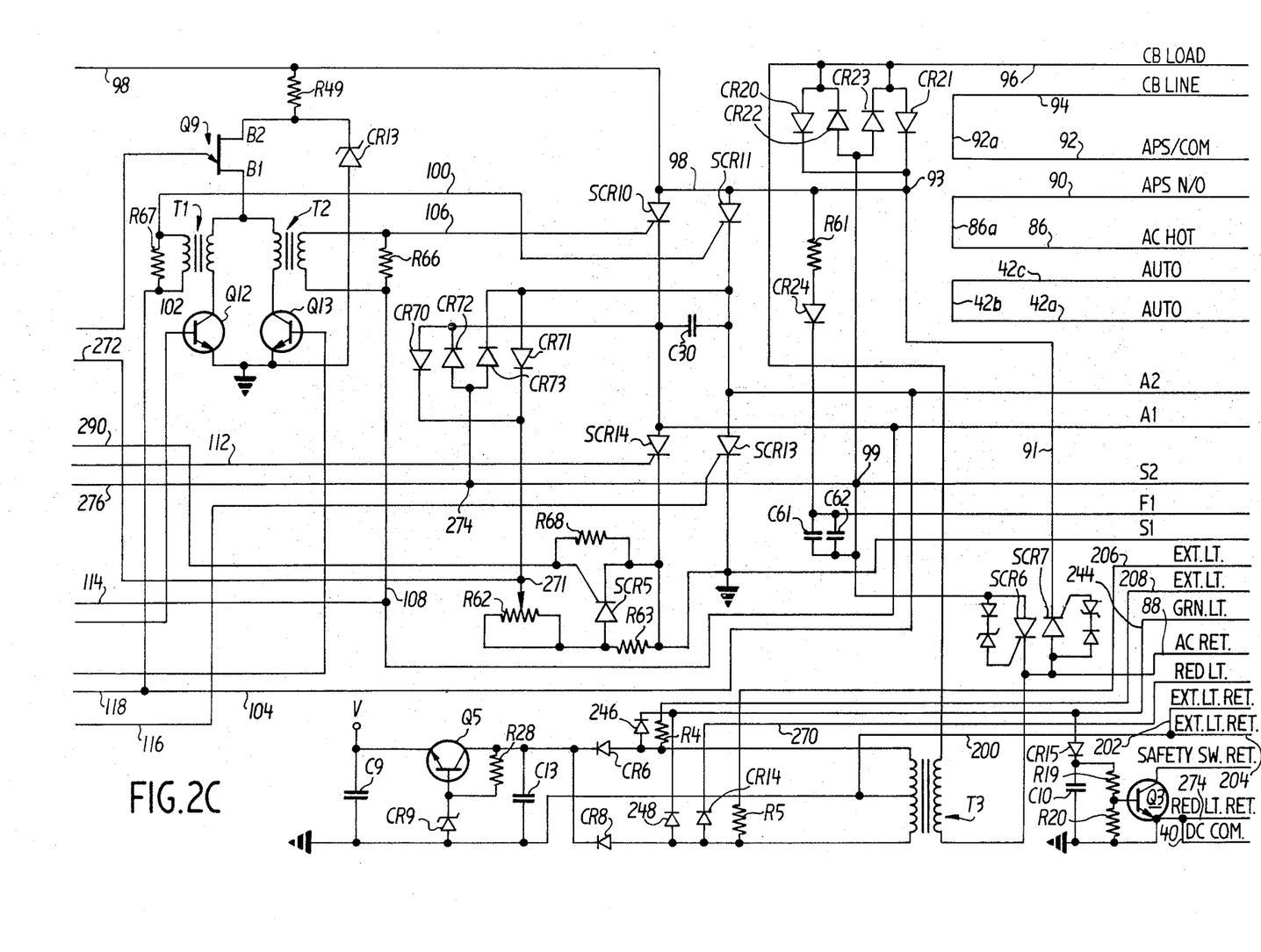

The universal controls 10 are shown in FIGS. 2A–2C. The universal controls include circuits for accelerating, decelerating, braking, and generally controlling the speed and direction of rotation of the drive motor 11 shown in FIG. 1. In addition, the universal control includes circuits for energizing various indicator lights and circuits responsive to various unsafe error conditions in the system for stopping the drive motor. The various functions of the universal control circuits are described below.

DIRECTION CONTROLS

As previously stated, the mechanized filing system of FIG. 1 includes a plurality of carrier bins which travel in an orbital path to the position adjacent a posting board. The particular carrier bin which is brought into position opposite the posting board is determined by the push-button switch which is depressed. The carrier mechanism is driven by a drive motor which may be driven in either of two directions so that the selected carrier bin is moved into position opposite the posting board by traveling the shortest distance around the orbital path. The commutator rings 18, 20, 22, 24 and 26 (FIG. 1) in conjunction with the selected push-button switch, automatically determine the direction in which the carrier bins must be driven in order to bring the selected carrier bin into position opposite the posting board by traveling the shortest distance. In order to reduce access time, it is desirable that once a push-button switch has been depressed to select a particular carrier bin, the carrier bins be moved as rapidly as possible to bring the selected carrier bin, into position opposite the posting board. There are, however, other considerations. For example, if the carrier bins are traveling at a high speed and are suddenly stopped, the contents of the carrier bins might be upset or thrown about. Furthermore, a sudden stop of this type might damage the entire conveyor system because of the mass being transported in the carrier bins. Thus, as explained in U.S. Pat. No. 3,614,578, it is preferable that the carrier bins be accelerated to some fast speed and then, as the selected bin approaches a position opposite the posting board, the carrier bins be slowed down before the drive motor is completely stopped. Therefore, commands or output signals from commutator rings 18, 20, 24 and 26 determine not only the direction in which the drive motor is rotated, but also the speed at which the motor is driven. Initially, a low level output signal from commutator ring 20 may energize the drive motor to move the carrier bins in the upward direction at a fast rate. As the selected bin approaches the posting board position the low level signal from ring 20 is terminated. At the same time, a low level output signal from commutator ring 18 energizes the drive motor to drive the carrier bins in the upward direction at a slow rate. Just as the selected bin reaches the posting board position the signal from ring 18 terminates the drive motor is stopped. In like manner, a low level output signal from commutator ring 24 initially causes the carrier bins to move downwardly at a fast rate and subsequently a low level output signal from the commutator ring 26 causes the carrier bins to move downwardly at a slower rate until the bin is in the posting board position. The circuits for producing these commutator ring output signals are derived as follows.

In FIG. 2C a lead 40 is connected to the circuit common, hereafter sometimes referred to as ground or the low logic level. As shown in FIG. 1, the lead 40 is connected to the common terminal of the Auto-Manual switch S9. For automatic operation the switch S9 is in the position shown so that the low level signal appears on lead 42a. The lead 42a is connected by means of a jumper connection 42b (FIG. 2C) to lead 42c (FIG. 1). The signal on lead 42c is applied through the normally closed contacts of a manually operated reset switch 44, the normally closed contacts of a posting board latch switch S7, to the posting board position switch S8. Depending upon the position of the posting board, the low level signal is directed into the left or into the right column of contacts associated with the push-button switches. From the switches the signal is applied to the commutator ring 22 and from this ring to one of the commutator rings 18, 20, 24 or 26. Reference should be made to U.S. Pat. No. 3,614,578 for a detailed explanation as to how the signal applied to the commutator ring 22 is transferred to the other rings.

In the system shown in FIG. 1, direction commands may also be produced when the Auto-Manual switch S9 is in the Manual position and the operator actuates the Up-Down switch S10. The setting of the Auto-Manual switch to Manual opens the circuit so that no commands are generated through the commutator rings.

When the system is driven by operator actuation of the Up-Down switch S10, only an Up Slow or a Down Slow command is generated. The drive motor is not driven at a fast rate when the switch S10 is used. The circuit for generating the command extends from circuit common and lead 40 (FIG. 2C) into FIG. 1, switch S9, and lead 41 to the operating contact of the Up-Down switch S10. If the switch is in the Up position, the circuit extends over lead 43 into FIG. 2A where it connects with the Up-Slow input lead 28. If the switch is in the Down position, the circuit extends over lead 45 to FIG. 2A where it connects with the Down Slow input lead 34.

The direction and speed control commands from the commutator rings 18, 20, 24 and 26 and the Up-Down switch S10 appear on leads 28, 30, 32 and 34 and are applied to the logic circuits shown in FIG. 2A. The Up-Fast command on lead 30 is applied to one input of two AND gates 46 and 48. The Down-Fast command on lead 32 is applied to a second input of gate 48. The Up-Slow command on lead 28 is applied to the second input of gate 46 and to one input of a further AND gate 50. The Down-Slow command on lead 34 is applied to a second input of gate 50.

All inputs of the gates 46, 48 and 50 are tied through resistances R11 to a positive logic voltage source V. Thus, in the absence of low level input signals on the leads 28, 30, 32 and 34 the outputs from the gates remain at a high level. The output of gate 46 is connected by a lead 52 to a direction control flip-flop 54. The output of gate 48 is connected directly to one input of an AND gate 56 and is connected through a resistance-capacitance-diode filter circuit 58 to a second input of gate 56. In a similar manner, the output of gate 50 is connected directly to one input of an AND gate 60 and through a filter 62 to a second input of the gate 60.

The purpose of the filters 58 and 62 is to eliminate brush noise occurring at the commutator segments or contact bounce noise occurring at manually operated switch contacts. Considering filter 58, the output of gate 48 goes low for a Fast command. If brush noise or switch bounce occurs the output of gate 48 goes high. However, because capacitor C1 cannot charge to the threshold of gate 56 for some 10 milliseconds, the output of gate 56 remains low. As the output of gate 48 goes back low C1 quickly discharges through CR1.

During normal operation when a fast command is terminated, the output of gate 48 goes high and stays at this level. 10 milliseconds later the output of gate 56 goes high but, as capacitor C1 is going through the threshold of gate 56, the gate oscillates at a very high frequency. A capacitor C21, connected at the output of AND gate 72, is provided to suppress any adverse effects this oscillation might have on certain signals.

The output of gate 56 is connected to one input of a NAND gate 64. The output of AND gate 60 is connected to a second input of NAND 64 and to one input of NAND gate 70. NAND gates 64 and 70 have their outputs cross coupled to form a flip-flop 65 with the output of gate 70 being provided with a resistance-capacitance reset delay network.

The output of gate 64 is connected to one input of an AND gate 72. A normally high level signal is applied to the second input of gate 72 and to a third input of the gate 70, as subsequently explained.

The output of gate 72 is the RUN command. It must be at a high level for the drive motor to be energized. When the RUN command drops to a low level, a stop sequence is initiated, as subsequently explained, to stop the drive motor. The RUN command is generated only when the flip-flop is set to produce a high level signal at the output of gate 64. An Up-Fast or a Down-Fast command acts through gates 48 and 56 to drive the output of gate 64 high to generate the RUN command.

The output of gate 64 remains high after the Up Fast or Down Fast command is terminated because with the output of gate 64 at the high level all inputs to gate 70 are high and this gate produces a low level signal that is applied to gate 64. A Fast Command (Up or Down) is always followed by a Slow command in the same direction so the Fast command may leave flip-flop 65 in the set condition.

A Slow command (Up or Down) acts through gates 50 and 60 to drive the output of gate 64 high and generate the RUN command. However, the slow command also applies a low level input to gate 70 so that the flip-flop 65 assumes the reset state when the Slow command is terminated. The flip-flop assumes the reset state on termination of the Slow command because of the delay caused by R4 and C3.

The Run command is applied over leads 74 and 76 to the direction flip-flop 54. The flip-flop 54 is set to produce a low level output signal on a lead 78 if the RUN command occurs without a low level signal on lead 52. However, if the RUN command occurs as a result of an Up Fast command on lead 30 or an Up slow command on lead 28, the output from gate 46, appearing on lead 52, is at a low level and this in combination with the RUN command sets the direction flip-flop 54 so that it produces a low level output signal on lead 80. Once the flip-flop is set, its condition cannot be changed until the occurrence of another RUN command.

The lead 78 is connected to one input of a NAND gate 82 and, as subsequently explained, the resulting high level output from this gate causes current flow through the armature of the drive motor in such a direction as to drive the carrier bins in a downward direction. The lead 80 is connected to one input of a NAND gate 84 and a high level output signal from this gate causes current flow through the armature of the drive motor in a direction such that the carrier bins are driven in an upward direction.

The output of the gate 84 is connected through a resistor R27 to the base of a grounded emitter transistor Q12. The output of the gate 82 is connected through a resistor R36 to the base of a grounded emitter transistor Q13. A transformer T1 has its primary winding connected between B1 of a unijunction transistor Q9 and the collector of Q12. The primary winding of a second transformer T2 is connected between B1 and the collector of Q13.

Four SCR's, SCR10, SCR11, SCR13, and SCR14 comprise a full wave DC bridge for driving the filing cabinet motor in either direction. In FIG. 1, a 120 volt AC source provides the power for driving the motor. The AC source is connected to the control circuits 10 by a pair of leads 86 and 88. In FIG. 2C, the lead 88 is connected to the cathode of SCR6 and the anode of SCR7. The cathode of SCR7 is connected by a lead 91 to a junction point 93 and the anode of SCR6 is connected by a lead 97 to a junction 99. The AC lead 86 is connected by a jumper 86a to a lead 90 and this lead is connected to one side of the interlock switch S5. This switch is closed during normal operation and when opened switch S5 removes all power from the machine. From switch S5 a lead 92 extends back to FIG. 2C where it is connected by jumper 92a to a lead 94. Lead 94 extends into FIG. 1 where it is connected to a circuit breaker 95. From the circuit breaker a lead 96 extends back into FIG. 2C where it is connected to the anodes of two rectifiers CR20 and CR21 and the cathodes of two rectifiers CR22 and CR23. The cathodes of rectifiers CR20 and CR21 are connected to the junction point 93 and the anodes of CR22 and CR23 are connected to the junction point 99. CR20 and CR21, together with SCR7 provide full wave rectification so that a full wave rectified 120 volt signal appears at junction 93. This voltage is applied over lead 98 to the anodes of SCR10 and SCR11. The cathode of SCR11 is connected to the anode of SCR13 and the cathode of SCR13 is connected to the circuit common. In like manner, the cathode of SCR10 is connected to the anode of SCR14 and the cathode of SCR14 is connected to circuit common. Two leads A1 and A2 are connected to the anodes of SCR13 and SCR14 and, as shown in FIG. 1, the armature 12 of the drive motor is connected across these leads.

The shunt field winding 16 of the motor is connected between point 93 and junction 99. The circuit extends from point 93, R61, CR24, lead F1, shunt field winding 16, and S2 to junction 99.

The series field winding 14 of the motor is connected between circuit common and junction 99 by the leads S1 and S2. CR22 and CR23, or SCR6 provide a return path to one side 96 or the other side 88 of the AC source, depending upon which side is negative during the particular half cycle.

The gate of SCR11 is connected by way of a lead 100 to one end of the secondary winding of transformer T1. The other end of the secondary winding is connected back to the cathode of SCR11 by leads 102, 104, and A2. The gate of SCR10 is connected by a lead 106 to one end of the secondary winding of transformer T2 and the other of this winding is connected back to the cathode of SCR11 by leads 108, 110, and A1.

The turn-on of SCR14 is controlled by SCR1 and the turn on of SCR13 is controlled by SCR3. The gate of SCR14 is connected by a lead 112 to a junction between two resistors R29 and R30. The other end of R29 is grounded. R30 is connected to the cathode of SCR1 and through a capacitor C25 to the gate electrode. The gate electrode of SCR1 is connected to the output of gate 84 through a resistor R26. The anode of SCR1 is connected by leads 114, 110 and A1, to the anode of SCR14.

The gate of SCR13 is connected by a lead 116 to a junction between two resistors R31 and R32. The other end of R31 is grounded. The resistor R32 is connected to the cathode of SCR3 and through a capacitor C24 to the gate of SCR3. The gate electrode is also connected through a resistor R37 to the output of gate 82. The anode of SCR3 is connected by leads 118, 104 and A2 to the anode of SCR13.

The operation of the direction control circuits in response to an Up command is as follows. When the drive motor is to be rotated so as to move the carrier bins in the up direction, the output of gate 84 rises to the high level and through R26 conditions the gate electrode of SCR1 so that the SCR will fire when its anode goes positive. However, SCR1 does not fire immediately.

The output of gate 84 is also applied through R27 to Q12 to turn this transistor on. The wave rectified voltage on lead 98 causes current flow through R49, Q9, the primary of T1, and Q12 to ground. Q9 is part of a control circuit which controls the motor speed by controlling the phase angle at which SCR10 and SCR11 are fired. Speed control is explained later. As Q9 conducts in each half cycle, a pulse is produced at the secondary winding of T1 which makes the lead 100 positive with respect to lead 102. This makes the gate electrode of SCR11 positive with respect to the cathode so SCR11 begins to conduct. When SCR11 conducts the full wave rectified voltage on lead 98 is applied through SCR11, over lead A2, through drive motor armature 12, and over leads A1, 110 and 114 to the anode of SCR1. As SCR1 conducts the circuit is extended through R30 and R29 to ground, thus raising the voltage at the junction between R29 and R30. This voltage is applied over the lead 112 to the gate of SCR14 thus conditioning it for conduction. This completes a circuit for energizing the drive motor armature 12, the circuit now extending from lead 98, through SCR11, A2, the motor armature 12, A1, and SCR14 to circuit common. From circuit common a circuit extends over lead S1, the series field winding 14, and leads S2 to junction 99. From junction 99 the circuit is completed through CR22 and CR23 to lead 96, or through SCR6 to lead 88, depending upon which lead 88 or 96 is more positive during the half cycle.

In response to a Down command the output of gate 82 goes to a high level thus conditioning the gate of SCR3 so that SCR3 will conduct as soon as its anode goes positive. The output of gate 82 is also applied through R36 to transistor Q13 thus turning this transistor on. With Q13 on, the full wave rectified voltage on lead 98 is gated through Q9 and transformer T2 to ground. A pulse is produced at the secondary winding of T2 every half cycle with the lead 106 being driven positive with respect to lead 108. This drives the gate electrode of SCR10 positive with respect to its cathode. The full wave rectified voltage on lead 98 is gated through SCR10 over lead A1, through armature 12, and over leads A2, 104, and 118 to the anode of SCR3. SCR3 conducts and the circuit is extended through R32 and R31 to ground. This raises the voltage at the junction betwen R31 and R32 and this voltage is applied over lead 116 to condition the gating electrode of SCR13. The circuit is now established to energize the drive motor to drive it in the Down direction, the circuit extending from lead 98, through SCR10, lead A1, the drive motor armature 12, lead A2 and SCR13 to circuit common.

From the foregoing description it is seen that when an Up command is generated SCR11 and SCR14 cooperate to direct current through the armature motor in one direction while, when a Down command is given, SCR10 and SCR13 cooperate to direct current through the drive motor armature in the opposite direction. This of course causes the motor shaft to rotate in a first or a second direction to thereby move the carrier bins upwardly or downwardly.

SPEED CONTROL LOGIC AND STOP SEQUENCE

The level of the output signal from AND gate 68 determines the speed (i.e., fast or slow) at which the drive motor is operated. An Up-Fast or a Down-Fast command applied to gate 48 drives the output of gate 56 to the low level. This signal is inverted by inverter 66 and conditions one input of gate 68. The other input of gate 68 rises to the high level in response to the RUN command. With both inputs at a high level, the gate 68 produces the high level speed command FAST on lead 69. If a RUN command is produced as a result of an Up-Slow or a Down-Slow command the output of inverter 66 blocks gate 68 so a low level signal is produced on lead 69. As described hereafter a speed control circuit responds to a high level logic signal on lead 69 to drive the motor at a fast speed, and responds to a low level logic signal on lead 69 to drive the motor at a slow speed.

A Stop Sequence is initiated when the RUN command at the output of gate 72 drops to the low level. The purpose of the Stop Sequence is to stop the drive motor quickly but gently, and in such a manner that a RUN command in the opposite direction cannot be generated until the motor has completely stopped.

When the output of gate 72 drops to the low level, it blocks gate 68 and terminates any high level Fast command that may be present on lead 69. At the same time, the output of gate 72 is inverted at inverter 130 and passes through diode CR3 to become the high level STOP command on lead 131. The STOP command is applied to a speed control circuit to initiate stopping of the motor, as subsequently explained.

When the RUN command is terminated, it has no effect on flip-flop 54 since this flip-flop can change state only upon occurrence of a positive-going RUN command.

When the RUN command is terminated, the low level signal on lead 74 is inverted by NAND gate 132 and applied over lead 134 to an Anti-Plug single shot miltivibrator 140. The multivibrator is triggered and for 300 milliseconds produces a low level output signal on lead 136 to block an AND gate 236. The resulting low level output from gate 236 resets flip-flop 65 and blocks gate 72. This prevents another RUN command from being generated for approximately 300 milliseconds after a first RUN command is terminated. This insures that if the motor is being driven by one Run command in say the Up direction, that command cannot be terminated and a command generated to cause the motor to run in the opposite, i.e., Down, direction. Such a sudden change in commands would cause sudden reversals in current flow through the motor, resulting in possibly damaging high currents and torques.

At the same time the Anti-Plug multivibrator 140 is triggered, the high level signal on lead 134 triggers a Stop Delay multivibrator 150. The signal on lead 134 is also applied to both inputs of an AND gate 138. A resistance R5 and capacitance C4 delay one input to gate 138 so it is not conditioned for 25 $\mu$sec after the signal on lead 134 goes to the high level. At the end of 25 $\mu$sec the output of gate 138 conditions one input of NAND gate 142. Meanwhile, the output of multivibrator 150 has dropped to the low level to block gate 142. At the end of 60 milliseconds, miltivibrator 150 returns to its initial state and the lead 151 goes to the high level. Gate 142 is thus conditioned to produce a low level output signal to the direction gates 82 and 84. The outputs of gates 82 and 84 apply a short circuit across the motor armature through the series field and the stop sequence is completed. The outputs of gates 82 and 84 simultaneously condition SCR13 and SCR14 so that either end of the motor armature may be connected to circuit common. The braking path is completed through S1, the series field winding, S2, and CR72 or CR73.

The mechanized filing system of FIG. 1 is provided with various interlock switches and photocell detectors for stopping the drive motor or preventing its operation when various unsafe or abnormal conditions exist. As explained in U.S. Pat. No. 3,640,596, two photocells are provided for detecting the presence of an operator's arm or some other object extending through the carrier bin access opening while the drive motor is energized.

The photocells, PEC-1 and PEC-2, and their illuminating light sources 36 and 38 are shown in FIG. 1. The lamps 36 and 38 are energized as follows. In FIG. 2c, the primary of a transformer T3 is connected across the leads 96 and 88 so that the primary of the transformer is connected to the 120 volt AC power source. The secondary of the transformer is center tapped to provide a 6.3 volt AC signal between each end and the grounded center tap. From the grounded center tap a lead 200 connects with two leads 202 and 204 and these leads in turn are connected to one side of each of the lamps 36 and 38. The other side of lamp 36 is connected by a lead 206 and a resistor R5 back to one side of the transformer secondary while the other side of lamp 38 is connected by a lead 208 and a resistor R4 back to the other side of the transformer secondary. Therefore, as long as power is applied to the machine the lamps 36 and 38 are energized.

Light from the lamps 36 and 38 is focused on PEC-1 and PEC-2 so that normally the photocells exhibit a relatively low resistance. Photocell PEC-2 is connected by a pair of leads 210 and 212 to a first detector circuit 214 (FIG. 2a) while PEC-1 is connected by leads 216 and 218 to a second detector circuit 220. The two detector circuits are identical so only the details of detector 214 are shown in FIG. 2A. The detector includes a ground emitter transistor Q2 which functions as a resistance value sensor. The base of Q2 is connected through R15 to ground and through C6 to the collector. The base is also connected by lead 212 through PEC-2, lead 210, and R13 to the logic voltage source V. The collector of Q2 is connected through R14 to the logic voltage source V and the collector output from Q2 is applied through an inverter 222 to one input of an AND gate 224. The lead 210 is connected to the second input of the gate.

Resistance R13, the resistance of PEC-2 and R15 form a voltage divider network with the voltage at the base of Q2 bieng determined by the resistance of PEC-2. During normal operating conditions PEC-2 illuminated by light from source 38 so that its resistance is relatively low. Under these conditions the voltage at the base of Q2 maintains the transistor in a saturated condition so that a low level voltage appears at its collector. This logic level voltage is inverted by inverter 222 to condition one input of AND gate 224. The other input of this gate is tied to the high logic voltage V through R13 so that normally the output of gate 224 is at a high level.

Should the light from source 38 impinging on PEC-2 be interrupted for any reason, the resistance of PEC-2 increases thus lowering the voltage at the base of Q2. When the transistor Q2 is turned off its collector voltage rises to the high logic level thereby driving the output of gate 224 to the low level to thereby designate a Photocell Safety Error.

The output of gate 224 is connected by lead 226 to one input of a NAND gate 228. The output of detector circuit 220 is connected by a lead 230 to a second input of the gate. A reset flip-flop 232 has an output connected to the third input of gate 228.

All inputs to gate 228 are normally at a high level. The low level output signal from the gate is inverted at 234 and the resulting high level signal is applied to one input of AND gates 236 and 238. The second input to gate 238 is normally at a high level so the output from this gate is applied through R25 to the base of a grounded emitter transistor Q4. As long as there is no safety error condition, Q4 completes a circuit to energize a light on the control panel. The circuit extends from ground through Q4, lead 240, light 242 (FIG. 1), lead 244 to two diodes 246 and 248 (FIG. 2C). The diodes 246 and 248 are connected to opposite sides of the secondary winding of transformer T3 so that a 6.3 volt full wave rectified signal is applied to the light.

Whenever a Photocell Safety Error occurs, a low level signal on lead 226 or 230 drives the output of gate 228 to the high level. This output is inverted and blocks the gates 236 and 238. When gate 238 is blocked its low level output turns off transistor Q4 to extinguish the light 242. The output of gate 238 is applied over lead 250 and a resistor R53 to the base of a grounded emitter transistor Q14. This transistor is normally conducting but when the output of gate 238 drops to the low level the transistor is turned off. The collector of the transistor is connected through a resistor R52 to the high level logic voltage. The collector of the transistor is also connected to the Reset flip-flop 232 to drive the output of the flip-flop to the low level. The flip-flop locks the error condition into the machine so that it may only be reset by a positive manual operation by the operator as subsequently explained.

The output of gate 236 drops to the low level at the same time as the output of gate 238. The output of gate 236 blocks gates 70 and 72 thereby terminating the RUN command. When the RUN command is terminated a Stop sequence is initiated and carried out as previously described.

The drive motor may be stopped if any of the safety switches S0 – S4 or S6 (FIG. 1) is opened. These switches include four safety bar switches as disclosed in U.S. Pat. No. 3,640,596, a manual stop switch, and a front panel switch. The switches are connected in series between the high level logic voltage and the collector of a power monitor transistor Q3. The circuit extends from the high level logic voltage through R16 (FIG. 2A), lead 250, the safety switches, lead 252, to the collector of Q3 (FIG. 2C).

Transistor Q3 is normally maintained in a conducting state because of the base voltage derived from the secondary of transformer T3 through diodes 246 and 248. These diodes are connected by lead 244 to a further diode CR15. A capacitor C10 is connected in parallel with two resistors R19 and R20 between diode CR15 and ground. The base of Q3 is connected to a junction between R19 and R20. Transistor Q3 serves as a power supply monitor in that it is turned off and will generate a Safety Error if the proper voltage is not present at the secondary of transformer T3.

As long as transistor Q3 is conducting and all of the safety switches are closed, the lower end of resistor R16 (FIG. 2A) is substantially at ground level. This ground level signal is inverted by an inverter 254 so that normally a high level signal enables the gates 132 and 238. If any of the safety switches should be opened, or if a problem should develop with the power supply so that the transistor Q3 is turned off, the voltage at the lower end of resistor R16 will rise to the high level. This signal, after inversion at 254, blocks gates 132 and 238 to stop the drive motor in the same manner as previously described in connection with a Photocell Safety Error. In addition, the low level signal at the lower end of R16 is appled through CR4 to immediately generate a Stop command on the lead 131.

The Reset flip-flop 232 is triggered by either an error signal from the photocell detector circuits or an error signal from the safety switches. Once it is set, the flip-flop may be reset only by having the operator manually operate a switch on the control panel. The reset switch 44 (FIG. 1) has its operating contact connected to ground by a circuit extending form the contact over leads 42c, 42b (FIG. 2c), 42a, switch S9 (closed for Auto mode) (FIG. 1), and lead 40 (FIG. 2C). When the operator operates the reset switch the ground level signal is applied over lead 260 to reset the flip-flop 232.

When switch S9 is not set for the Auto mode, i.e., when the operator is controlling the drive motor direction by operating the Up-Down switch S10, the reset input of flip-flop 232 is continuously grounded. The ground level signal on lead 40 passes through S9 (set for Manual), and over lead 261 to FIG. 2A and the reset input of flip-flop 232.

SPEED CONTROL

The basic element for controlling the motor speed is a differential amplifier Q10 (FIG. 2B) which compares a feedback voltage, representing motor speed and applied to the base of the transistor, with a reference voltage applied to the emitter The reference voltage is derived from the full wave rectified AC voltage present on lead 98. The voltage on lead 98 is applied through CR11, R38, R34 and R46 to the emitter of Q10. This voltage is also applied through resistor R49 to base 2 of a unijunction transistor Q9. Base 1 of Q9 is connected to the primary windings of transformer T1 and T2 as previously described.

The emitter of Q9 is connected to the collector of Q10 and a capacitor C17 is connected between the collector and ground. A diode CR17 is connected between the reference voltage and the base of Q10.

The reference voltage is also applied through R34 to the anode of SCR2, the cathode of SCR2 being connected to ground through a low value resistor R35 and the gate electrode being connected to receive the STOP command on lead 131. A capacitor C14 and a diode CR10 are connected in parallel between ground and the junction between R34 and R46.

As long as the STOP command is present, the gate of SCR2 is conditioned and, because of the low value of R35, the reference voltage E(REF) remains at essentially zero because a circuit exists from lead 97, through SCR2 and R35 to ground.

When the STOP command is terminated, i.e., when it is desired to drive the motor, SCR2 is turned off because the current provided through R38 is below its holding current. E(REF) then begins charging C14 toward the peak line voltage (i.e., 165 volts). However, R38 and C14 comprises a large RC network and the rate of charge of C14 is limited. As will be evident later, this provides a "soft" motor start. CR10 limits the charge on C14 to about 45v. DC and determines the value of E(REF). In a preferred embodiment, the charging time to 45v. DC was chosen as 450 msec.

E(REF) is applied to the emitter of Q10 through R46 while the feedback voltage, derived as explained later is applied to the base of Q10 over lead 95. Q10 conducts to a degree determined by the difference between the values of the feedback voltage and E(REF), and as it conducts, it charges C17. On each powerline half cycle that the feedback voltage is below E(REF) the voltage at the collector of Q10 rises as C17 charges until it reaches the firing voltage of Q9. When Q9 fires, the charge on C17 is dumped through Q9. Since base 2 of Q9 is connected to the source of full wave rectified AC voltage, it conducts until the end of the half cycle when the voltage goes to zero.

When Q9 conducts, a circuit is completed through T1 and Q12 or T2 and Q13 as previously described in connection with the direction control circuits. Thus, on each half cycle, either T1 or T2 produces a pulse to turn on SCR11 or SCR10. Since the charge on C17 drops to essentially zero each half cycle when the AC wave at base 2 of Q9 goes to zero volts, and since the same AC wave is applied to the cathodes of SCR10 and SCR11, it is seen that the circuit functions as a phase controller which determines the phase during each half cycle at which SCR10 or SCR11 is fired. If the difference between the motor speed feedback voltage and E(REF) is great, C17 charges faster thus firing Q9 early in the half cycle. This in turn fires SCR10 or SCR11 early in the cycle to apply a higher average voltage to the motor and increase its speed. When the motor is operating closer to the desired speed, the relatively smaller difference between E(REF) and the feedback voltage causes C17 to charge at a slower rate so Q9 fires later in the half cycle.

The feedback voltage applied to the base of Q10 is a signal obtained by modifying two signals derived from the motor. In FIG. 2C, two diodes CR70 and CR71 have their cathodes connected together and to the tap on a variable resistor R63. Both ends of R63 are grounded. The anodes of CR70 and CR71 are connected to the cathodes of SCR10 and SCR11, respectively, since the motor armature is connected between the cathodes of SCR10 and SCR11, it is evident that a parallel circuit is established around the armature when either SCR11 and SCR14, or SCR10 and SCR13 are conducting so as to apply voltage to the armature. If SCR11 is conducting a circuit paralleling the armature extends from SCR11, through CR71, R62 and R63, to ground. If SCR10 is conducting, a circuit paralleling the armature extends from SCR10, through CR70, R62 and R63 to ground. In either case, a voltage representing the armature voltage, E(ARM) is produced at the point 271 and is applied over lead 272 to the junction between a resistor R45 and a grounded resistor R48.

The series field voltage is integrated and used as an I-R compensation signal. In FIG. 2c, the junction point 274 is connected by lead S2 to one end of the series field, and is connected by diodes CR72 and CR73 to the anodes of SCR10 and SCR11. The point 274 represents the series field voltage with respect to ground and the signal level at this point is applied over lead 276 to the speed control circuits of FIG. 2B where it is integrated by the integrator circuit comprising R40 and C16.

The speed control circuits include a transistor Q7 having a grounded base, and an emitter connected through a resistance R41 to the junction between R40 and C16. The collector of Q7 is tied to a lead 278 which connects with one end of R45 and the base of Q10.

A grounded emitter transistor Q8 has a collector connected through R39 to lead 278 and a base connected through R44 to the lead 69 which carries the FAST command. A further resistor R50 is connected in series with a capacitor C18 between lead 278 and ground.

The feedback speed control circuits function as follows. The voltage E(ARM) on lead 272 causes a feedback voltage at the junction of leads 95 and 278 which is applied to the base of the speed control comparator Q10. As motor current increases, the integrated series field voltage on lead 276 renders Q7 more conductive so a portion of the feedback current from the armature is shunted through Q7 thus lowering the voltage at the base of Q10. This increases the firing angle of the phase controller to increase the motor speed.

The speed control circuit maintains the motor voltage at 45V DC corresponding to 1,250 RPM armature speed. The transistor Q8 is turned on in response to a FAST command from the control logic circuit and whn Q8 is conducting the motor speed is 2,500 RPM. The transistor Q8, its collector resistor R39, and the armature feedback resistor R45 comprise a 2-to-1 voltage divider. Again, the feedback is maintained at 45V DC thus requiring the motor to generate a back EMF of approximately 90V DC, this back EMF corresponding to a speed of 2,500 RPM.

Figures 2D, 3:
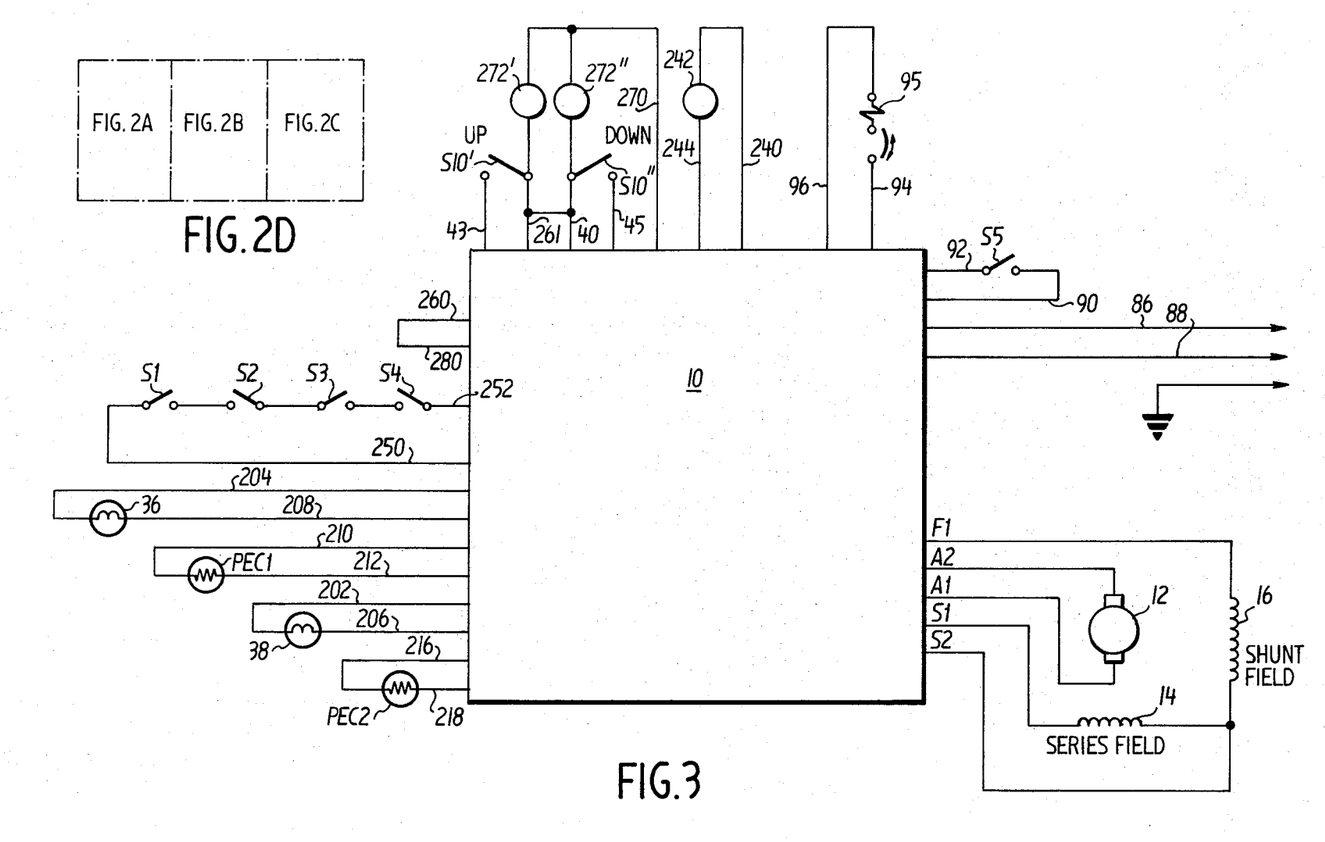

The lead 280 carries a further speed control signal that is not used in the system configuration shown in FIG. 1, but is used instead in the system configuration shown in FIG. 3. The lead 280 is left unconnected for the FIG. 1 configuration and is permanently grounded in the FIG. 3 configuration. R50 and R45 establish a 68 percent feedback ratio resulting in a nominal motor speed of 1,850 RPM with a 67V DC armature voltage.

BRAKING CONTROL

A two stage braking system is employed to stop the motor in response to a STOP command on lead 131 (FIG. 2B). As previously described, the STOP command turns on SCR2 thereby dropping E(REF) to substantially ground level. This blocks Q10 and it in turn prevents the application of phase controlled pulses to the motor.

When SCR2 is turned on, the voltage level at its cathode rises from ground level to a slightly positive level. A signal is thus produced on lead 290 to turn on SCR5. The cathode of SCR5 is connected directly to ground and the anode is connected to ground through R63. When SCR5 is turned on it effectively shorts out R63 thus reducing the resistance of the parallel circuits around the armature. One of these circuits now extends from SCR11 through CR71 and R62 to ground while the other extends from SCR10 through CR70 and R62 to ground. The lower resistance, resulting from the shorting out of R63, causes current flow away from the armature circuit thus braking the motor.

The final braking step occurs about 60 msec. later when the logic circuit drives the outputs of direction gates 82 and 84 to the high level thereby enabling both SCR13 and SCR14. The cathodes of both SCRS are connected to ground and from ground over lead S1, through the series field winding, lead S2, and diodes CR72 and CR73 back to the anodes of the SCR's. Since the motor armature is connected between these anodes, it is seen that a short circuit is completed around the armature through the series field winding when SCR13 and SCR14 are turned on.

FIELD STORAGE

It is desirable that the motor proceed to a controlled stop in the event of a loss of power. This requires the storage of sufficient energy to brake the motor for approximately 150 msec. after the power loss. In FIG. 2C, the energy is stored on two capacitors C61 and C62. These capacitors are charged by the 120 volt full wave rectified AC voltage at point 93, the circuit extending from point 93, through R61 and CR24 to the capacitors. The other side of the capacitors is connected to whichever of the AC input lines is more negative, i.e., through SCR6 to line 88, or through CR22 and CR23 to line 96.

When power is lost, C61 and C62 discharge over lead F1 and through the shunt field winding to ground thus maintaining field current to stop the motor.

LOGIC POWER SUPPLY

The logic power supply is shown in the lower portion of FIG. 2C. The two ends of the secondary of transformer T3 are connected through diodes CR6 and CR8 to the collector of the transistor Q5. A resistor R28 is connected between the collector and base of Q5 and the base of Q5 is connected through CR9 to ground. The emitter of Q5 is connected to the logic power supply output terminal V and a capacitor C9 is connected between the output terminal and ground. A capacitor C13 filters the full wave 6.3 volt signal supplied through CR6 and CR8. Q5 in combination with R28 and CR9 comprises a regulator which regulates the output voltage V at approximately 5 volts.

A red light is provided on the control panel to indicate that power is being supplied to the logic circuits. The circuit for energizing this light extends from T3 through CR14, lead 270 to the red light 272 (FIG. 1), and from the light by way of lead 274 back to ground in FIG. 2C.

ALTERNATIVE EMBODIMENT

On advantage of the present invention is that by providing suitable electrical connectors for the input and output leads to the circuits of FIGS. 2A through 2C, the universal control 10 may be used with different mechanized filing systems to control the drive motors of the systems. FIG. 1 shows how the universal control 10 may be interconnected with the circuits of a mechanized filing system such as that sold under the trademark "Lektriever 100." FIG. 3 shows how the universal control 10 may be interconnected with the circuit of another type of mechanized filing system such as that sold under the trademark "Kitchentriever."

When used with the apparatus of FIG. 3, the universal control operates in essentially the same manner as that of FIG. 1 when the FIG. 1 apparatus is set for manual operation under the control of the Up-Down switch. In FIGS. 1 and 3, like elements have been assigned like reference numerals.

The system of FIG. 3 is designed to operate at a nominal motor speed of 1,850 RPM. This requires that lead 280 (FIG. 2B) be grounded. In FIG. 3, lead 280 is connected to lead 260. In FIG. 2A, lead 260 connects with the Reset Flip-flop 231 and with a lead 261. In FIG. 3, lead 261 connects with lead 40 which is grounded in FIG. 3. Thus, the motor operates at only one speed. Furthermore, since the device operates under manual control, the reset flip-flop is permanently grounded.

The alternative embodiment employs separate switches for up-down control, rather than a single switch as in the system of FIG. 1. The Up and Down switches S10' and S10'' have their movable contacts connected together and to ground through the two leads 40 and 261. Two Power On lamps, 272' and 272'' are connected between ground and lead 270 to provide an indication that the power is ONE.

Bearing in mind that the embodiment of FIG. 3 operates in the same manner as the embodiment of FIG. 1 when FIG. 1 is set for the manual mode, further description of FIG. 3 is not believed necessary.

The embodiments of the invention in which an exclusive property or privilege is claimed are defined as follows:

1. A motor control circuit for controlling a motor having an armature and a series field winding, said motor control circuit comprising:
   a source of full wave rectified AC voltage;
   means connecting said armature and said series field winding in series across said source of voltage, said means including gating means for selectively connecting said source and said armature so that current may flow through said armature in a first or second direction;
   comparator means responsive to a reference voltage and feedback signal for producing output pulses each having a duration proportional to the difference in magnitude of the signals being compared;
   means responsive to said source for applying a reference voltage to said comparator means;
   feedback means responsive to a signal from said motor representing motor speed for applying a feedback signal to said comparator means;
   logic circuit means including means for selectively generating a first and second direction command; and,
   phase controller means responsive to said source, said comparator, and said direction commands for selectively producing phase control pulses;
   said gating means being responsive to said phase control pulses and said direction commands for selectively connecting said source and said armature.

2. A motor control circuit as claimed in claim 1 wherein said feedback means includes speed control means and said logic circuit means includes means for generating nominal speed selection commands;
   said speed control means being responsive to said logic circuit means and the signal representing motor speed for producing said feedback signal.

3. A motor control circuit as claimed in claim 2 and further comprising means for applying to said speed control means a signal representing series field voltage, said speed control means being responsive to said signal, the signal represent motor speed, and said nominal speed selection commands, for producing said feedback signal.

4. A motor control circuit as claimed in claim 1 wherein said logic circuit means includes means for generating a stop command, and said means for applying said reference voltage includes means responsive to said stop command for terminating the application of said reference voltage to said comparator means.

5. A motor control circuit as claimed in claim 4 wherein said logic circuit means includes means for simultaneously generating two direction commands, said gating means being responsive to two simultaneously generated direction commands for shorting said armature.

6. A motor control circuit as claimed in claim 1 wherein:
   said logic circuit means includes first logic gating means responsive to four input signals each representing both a speed and a direction for generating a RUN command and a direction signal;
   a flip-flop settable to one state by initiation of said RUN command when said direction signal is present and to the other state by initiation of said RUN command when said direction signal is not present, said flip-flop controlling said means for selectively generating direction commands; and,
   means responsive to termination of said RUN command for disabling said first logic gating means for a predetermined interval so that a second RUN command or direction signal cannot be generated.

7. A motor control circuit as claimed in claim 6 wherein said logic circuit means includes a delay means responsive to termination of said RUN command for enabling said means for generating direction commands whereby two direction commmands are generated simultaneously a predetermined delay interval after said RUN command is terminated;
   said gating means being responsive to said simultaneously generated direction commands for shorting said armature.

8. A motor control circuit as claimed in claim 1 wherein said comparator comprises:
   a first transistor responsive to said feedback signal, for periodically charging a capacitor from said reference voltage at a rate determined by the difference in magnitudes between said feedback signal and said reference voltage.

9. A motor control circuit as claimed in claim 8 wherein said phase controller comprises:
   a unijunction transistor having a emitter controlled by the charge on said capacitor;
   a first and second series circuit each including a transistor and a transformer primary winding, said series circuits being connected in parallel and through said unijunction transistor to said source of full wave rectified voltage; and,
   first and second transformer secondary windings connected to said gating means;
   said transistors each being controlled by one of said direction comands generated by said logic circuit means.

10. A motor control circuit as claimed in claim 9 wherein said gating means comprises:
    said first and second silicon controlled rectifiers having anodes connected to said source of full wave rectified voltage;
    third and fourth silicon controlled rectifiers having anodes connected to the cathodes of the first and second silicon controlled rectifiers, respectively, and cathodes connected to circuit common;
    said first and second transformer secondary windings being connected to the gate electrodes of said first and second silicon controlled rectifiers, respectively; and,
    first and second means responsive to said first and second direction commands for controlling the gate electrodes of said third and fourth silicon controlled rectifiers, respectively;
    said armature being connected at one end to a first junction between said first and third rectifiers and at the other end to a second junction between said second and fourth rectifiers.

11. A motor control circuit as claimed in claim 10 and further including diode means connected between said series field winding and said first and second junctions whereby said series field winding is shorted around said armature when said third and fourth silicon controlled rectifiers are both rendered conductive by simultaneous occurrence of both said direction commands.

12. A motor control circuit as claimed in claim 11 and further including:
capacitor storage means connected to said source of full wave rectified voltage; and
a shunt field winding for said motor;
said storage means being connected to discharge through said shunt field winding upon termination of said full wave rectified voltage.

* * * * *

REEXAMINATION CERTIFICATE (106th)

United States Patent [19]
Palenchar et al.

[11] B1 3,866,100
[45] Certificate Issued Jul. 12, 1983

[54] UNIVERSAL MOTOR CONTROL

[75] Inventors: Daniel P. Palenchar; Wayne H. Lehker; David P. Lock, all of Marietta, Ohio

[73] Assignee: Kardex Systems, Inc., New York

Reexamination Request
No. 90/000,215, Jun. 7, 1982

Reexamination Certificate for:
Patent No.: 3,866,100
Issued: Feb. 11, 1975
Appl. No.: 365,241
Filed: May 30, 1973

[51] Int. Cl.³ .................................. G05B 11/14
[52] U.S. Cl. ............................. 318/257; 318/467
[58] Field of Search ............ 318/255, 258, 261, 265, 318/467, 486, 673, 561

[56] References Cited

U.S. PATENT DOCUMENTS

| | | | |
|---|---|---|---|
| 3,373,624 | 3/1968 | Gutting | 74/388 |
| 3,375,425 | 3/1968 | Bell | 318/302 |
| 3,428,880 | 2/1969 | Muller | 318/257 |
| 3,614,578 | 10/1971 | Woodward et al. | 318/673 |
| 3,636,424 | 1/1972 | Reed | 318/259 |
| 3,723,843 | 3/1973 | Pearson | 318/612 |

*Primary Examiner*—B. Dobeck

[57] ABSTRACT

A motor control circuit is provided for controlling the acceleration, speed, deceleration, stopping and direction of rotation of a drive motor which drives a mechanized filing cabinet. The control circuit is packaged so that it may be connected through electrical connectors to the drive motor, safety interlocks, and automatic and manual controls available on existing mechanized filing cabinets. It may be used with existing mechanized filing cabinets having manual, automatic, or both manual and automatic controls for driving the carrier bins in a cabinet in the shortest direction around an orbital path to a position opposite an access door. Under automatic control, the drive motor is accelerated to a fast speed and maintains this speed until the desired carrier bin approaches the access door. The drive motor is then driven at a slower rate as it comes into the desired position. A two-step braking circuit stops the motor in such a manner that the contents of the carrier bins are not thrown about. A feedback signal from the motor is used to regulate the speed of the motor and prevent excessive speed when an unbalanced load is carried in the carrier bins. Circuits are provided for preventing the inadvertent application of a reverse voltage to the motor while it is rotating.

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

The patentability of claims 2, 3, 5–7, and 9–12 is confirmed.

Claims 1, 4, and 8, having been finally determined to be unpatentable, are cancelled.

* * * * *